(12) United States Patent
Godard et al.

(10) Patent No.: US 11,953,152 B2
(45) Date of Patent: Apr. 9, 2024

(54) HIGH PRESSURE GAS TANK

(71) Applicant: FAURECIA SYSTEMES D'ECHAPPEMENT, Nanterre (FR)

(72) Inventors: Yannick Godard, Blussans (FR); Aldric Moussier, Burnhaupt le Bas (FR); Clément Duquet, Bavans (FR); Clément Grenet, Bavans (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 21 days.

(21) Appl. No.: 17/687,779

(22) Filed: Mar. 7, 2022

(65) Prior Publication Data
US 2022/0290817 A1 Sep. 15, 2022

(30) Foreign Application Priority Data

Mar. 10, 2021 (FR) .................................... 21 02338

(51) Int. Cl.
*F17C 13/00* (2006.01)

(52) U.S. Cl.
CPC ...... *F17C 13/002* (2013.01); *F17C 2201/0109* (2013.01); *F17C 2201/0147* (2013.01); *F17C 2205/0302* (2013.01); *F17C 2221/012* (2013.01); *F17C 2270/0168* (2013.01)

(58) Field of Classification Search
CPC ............ F17C 13/002; F17C 2201/0109; F17C 2201/0147; F17C 2205/0302; F17C 2221/012; F17C 2270/0168; F17C 2201/0128; F17C 2201/0157; F17C 2201/054; F17C 2201/056; F17C 2201/058; F17C 2205/01; F17C 2223/0123; F17C 2223/036; F17C 13/08; F17C 2205/00; F17C 2205/0196; F17C 2203/014; F17C 2203/015; F17C 2203/016; Y02E 60/32
USPC ........................................................ 220/581
See application file for complete search history.

(56) References Cited

U.S. PATENT DOCUMENTS

| | | | | | |
|---|---|---|---|---|---|
| 3,286,878 | A | * | 11/1966 | Schadt | F02K 9/605 220/723 |
| 4,976,110 | A | * | 12/1990 | Reid | F17C 13/005 220/560.13 |
| 6,015,041 | A | * | 1/2000 | Heung | C01B 3/0005 423/658.2 |
| 6,519,950 | B2 | | 2/2003 | Pelloux-Gervais et al. | |
| 7,152,665 | B2 | | 12/2006 | Toh et al. | |
| 8,430,237 | B2 | | 4/2013 | Westenberger et al. | |

(Continued)

FOREIGN PATENT DOCUMENTS

| | | | | |
|---|---|---|---|---|
| DE | 102007006047 B4 | * | 10/2008 | ....... B60K 15/03006 |
| KR | 20180025494 A | * | 3/2018 | |

OTHER PUBLICATIONS

"Elastic Deformation" article dated Jun. 16, 2020, retrieved from https://www.corrosionpedia.com/definition/2104/elastic-deformation (Year: 2020).*

(Continued)

*Primary Examiner* — John K Fristoe, Jr.
*Assistant Examiner* — Laura E. Parker
(74) *Attorney, Agent, or Firm* — Carlson, Gaskey & Olds. P.C.

(57) ABSTRACT

A storage tank comprises a gas storage chamber and at least one device to hold a component in the storage chamber.

7 Claims, 12 Drawing Sheets

(56) References Cited

U.S. PATENT DOCUMENTS

| | | | |
|---|---|---|---|
| 10,473,266 B2 | 11/2019 | Kondo | |
| 2003/0160054 A1* | 8/2003 | Stetson | F17C 11/005 220/577 |
| 2008/0105691 A1 | 5/2008 | Schlag | |
| 2008/0302110 A1 | 12/2008 | Handa | |
| 2010/0219087 A1* | 9/2010 | Fujita | H01M 8/04208 165/104.11 |
| 2012/0160712 A1* | 6/2012 | Yang | F17C 11/005 206/0.7 |

OTHER PUBLICATIONS

French Search report for Application No. FR 21 02338 dated Nov. 26, 2021.

\* cited by examiner

HIGH PRESSURE GAS TANK

CROSS-REFERENCE TO RELATED APPLICATIONS

This application is a U.S. non-provisional application claiming the benefit of French Application No. 21 02338, filed on Mar. 10, 2021, which is incorporated herein by reference in its entirety.

TECHNICAL FIELD

The present disclosure relates to a high pressure gas tank, in particular a hydrogen tank. Such a tank is intended to be fitted to a vehicle, for example, in particular a motor vehicle.

BACKGROUND

A high pressure gas tank comprising a wall delimiting a gas storage chamber is already known in the state of the art.

The present disclosure aims at improving such a gas tank by integrating at least one new function.

SUMMARY

To this end, the disclosure provides a pressurized gas storage tank for storing hydrogen. The pressurized gas storage tank comprises a gas storage chamber and at least one device configured to hold a component in the gas storage chamber.

The holding device makes it possible to integrate a component into the gas storage chamber, such as a sensor, a cable, a structural element or any other element that can be integrated into the tank.

A tank according to the disclosure may further comprise one or more of the following features, taken alone or in any technically feasible combinations.

- The storage chamber has a general shape defined about a central longitudinal axis, such as a shape with a circular, oval or square cross-section with rounded or unrounded corners, or a rectangular cross-section with rounded or unrounded corners, with the holding device configured to hold the component in one of the following configurations: the component is held substantially on the longitudinal axis, or the component is offset in relation to the longitudinal axis.
- The storage container includes a wall having an inner surface delimiting the storage chamber, the holding device being connected to the inner surface by at least three contact points.
- The holding device is connected to the inner surface along a continuous circumferential contact line extending around the entire circumference of the inner surface.
- The storage container includes a holding portion, intended for receiving the component, and at least one connecting portion, connecting the holding portion to the inner surface.
- The at least one connecting portion is elastically deformable.
- The holding device has only one connecting portion extending circumferentially around the holding portion, the connecting portion being formed by a foam.
- The holding device has only one connecting portion extending circumferentially around the holding portion, the connecting portion being formed by a mesh.
- The holding device has a plurality of connecting portions each extending radially from the holding portion, each connecting portion being formed by an elastic member such as an elastic blade or spring.
- The component forms a baffle, intended to deflect the flow of hydrogen gas when filling the tank.

BRIEF DESCRIPTION OF THE DRAWINGS

Various aspects and advantages of the disclosure will become apparent from the following description, which is given only as a non-limiting example and is made with reference to the appended Figures, among which.

DETAILED DESCRIPTION

Figure 1:
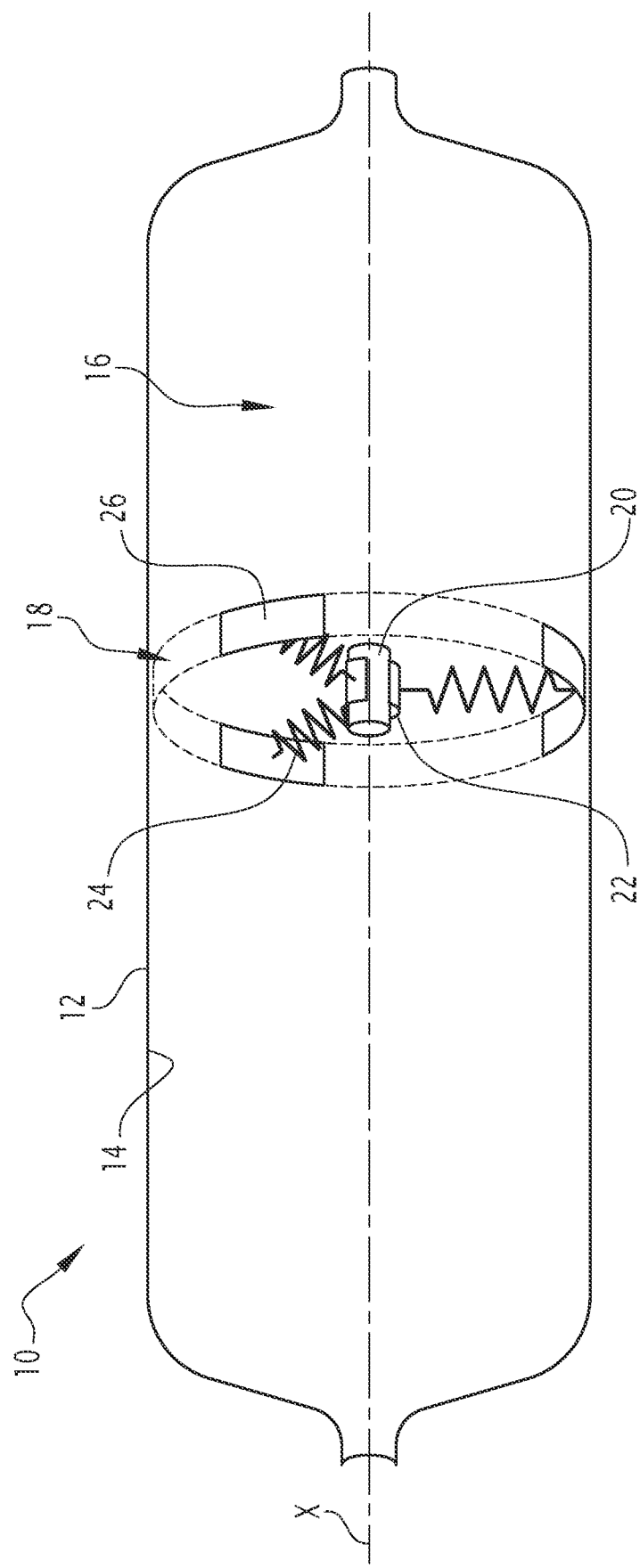
FIG. 1 is a schematic view of a high pressure gas tank according to a first example of an embodiment of the disclosure.

A pressurized gas tank 10 according to a first example embodiment of the disclosure is shown in FIG. 1. The tank 10 is intended for the storage of hydrogen, for example, and in particular for equipping a vehicle, more particularly a motor vehicle.

The tank 10 comprises a wall 12, having an internal surface 14 delimiting a gas storage chamber 16. The internal surface 14 preferably has a general shape of revolution defined about a longitudinal axis X. For example, the internal surface 14 has a cylindrical shape with a circular base, an oval base, or any other conceivable shape.

The wall 12 comprises, an inner lining surrounded by a structure, in particular a composite structure, for example, in a conventional manner. The wall 12 comprises a shell extending in a longitudinal direction (in particular parallel to the longitudinal axis X), closed at its ends by domed bases, for example, in a conventional manner.

The tank 10 according to the disclosure comprises at least one device 18 for holding a component 20 in the storage chamber 16. The component 20, shown very schematically in FIG. 1, is, a sensor, a cable or a structural element, for example, or any other element that can be integrated into the tank 10.

In a variant, the component 20 may be a floating element of the wall 12, in particular of its inner lining, of its composite structure, or of one of its bases.

It will be noted that, when the component 20 has a significant length along the longitudinal direction, parallel to the longitudinal axis X, such as when the component 20 is formed by a cable, this elongated component 20 may be held by a plurality of holding devices 18 distributed along the longitudinal direction. Such an elongated component 20 may also be partially supported by other holding elements in addition to the holding device(s) 18, such as by a holding portion formed by the wall 12 shaped for this purpose, in this case.

It is also possible to arrange several components 20 in the container 10, each component 20 being held by at least one holding device 18.

According to another embodiment, a single holding device 18 can carry several components 20.

It will be noted that the holding device 18 may be configured to hold a component 20 extending parallel to the longitudinal axis X, or, in a variant, to hold a component 20 extending radially, i.e. perpendicular to the longitudinal axis X. According to another embodiment, the holding device 18 may be configured to hold the component 20 along any conceivable direction.

The holding device 18 includes a holding portion 22 for receiving the component 20.

Advantageously, the holding device 18 is shaped to hold the component 20 substantially along the longitudinal axis X. In other words, the longitudinal axis X passes through the component 20 or in close proximity to the component 20.

To this end, the holding portion 22 is arranged substantially along the longitudinal axis X.

The component 20 is fixed to the holding portion 22, for example, or can be held freely movable in this holding portion 22, in a variant. For example, when the component 20 is a cable, the cable may simply pass through an opening in the holding portion 22, without any particular attachment.

The holding portion 22 is connected to the inner surface 14 by at least one connecting portion 24. According to the first embodiment, the connecting portions 24 extend radially.

Advantageously, each connecting portion 24 is elastically deformable, so as to allow the holding device 18 to adapt to any deformations of the wall 12. In particular, the wall 12 may undergo deformations based on the pressure inside the storage chamber 16, and it is thus preferable for the holding device 18 to be at least partially elastically deformable to ensure contact with the inner surface 14, even in the event of deformation of this inner surface 14.

According to the first embodiment, the connecting portions 24 are formed by elastic members such as springs, with each extending between the holding portion 22 and a respective connecting foot 26.

For example, the holding device 18 includes three connecting portions 24, each formed by an elastic member.

Each connecting foot 26 is arranged in contact with the inner surface 14. Thus, the holding device 18 is connected to the inner surface 14 by at least three contact points.

Preferably, each connecting foot 26 is fixed to the inner surface 14, such as by gluing.

In a variant, each connecting foot 26 is held against the inner surface 14 by friction, by being compressed against the inner surface 14 by the elastic connecting portion(s) 24, for example.

In a variant, connecting feet 26 may be provided free to rotate and/or translate relative to the inner surface 14. For example, each connecting foot 26 is arranged in a groove formed in the inner surface 14 and is held at the bottom of this groove by the elastic connecting portions 24. The groove is defined circumferentially about the longitudinal axis X, for example, or longitudinally parallel to the longitudinal axis X.

The holding device 18 may be made of any conceivable material, such as plastic, steel, aluminum or the like. It can be formed in one piece, or, in a variant, formed of several parts assembled together.

It will be noted that the wall 12 is formed of at least two half-shells, for example, allowing the insertion of the holding device 18 into the chamber 16 before the half-shells are closed. In a variant, the wall 12 is formed around the holding device 18.

According to a variant embodiment, the holding device 18 may be shaped to direct the flow of gas during filling or emptying of the tank 10. For example, connecting portions 24 in the form of helical gas-guiding blades may be provided.

In addition to the above-mentioned advantages, the holding device 18 also has the advantage of reducing the risk of collapse of the inner liner when the pressure inside the storage chamber 16 decreases. This is because the inner liner is held by the holding device 18, which bears against this inner liner in several directions, preferably at least three directions.

Various example embodiments of the holding device 18 are shown in FIGS. 2 through 7. In these Figures, elements similar to those in FIG. 1 are designated by identical references.

Figure 2:
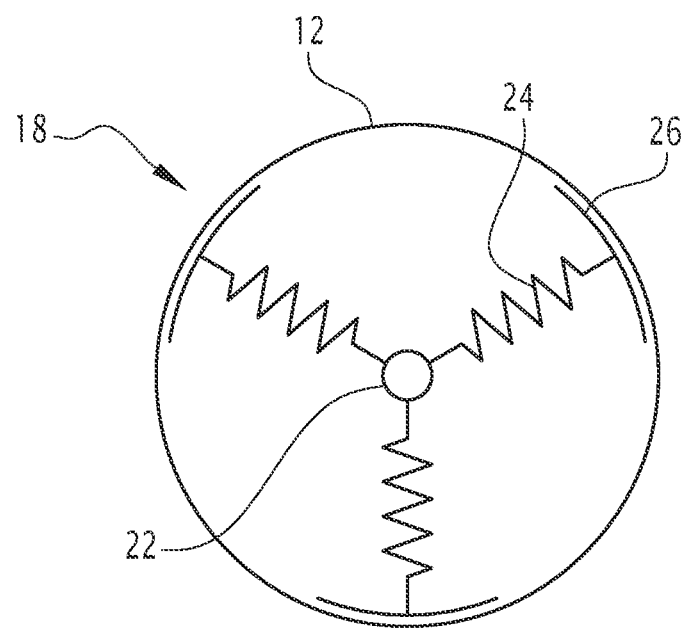
FIG. 2 shows schematically a holding device fitted to the tank of FIG. 1.

FIG. 2 shows the holding device 18 of the first embodiment described above. According to what is shown, this holding device 18 comprises three elastic connecting portions 24 extending in respective radial directions forming angles of 120° with each other about the longitudinal axis X. The connecting portions 24 are thus equally distributed angularly.

It will be noted that, in a variant, the holding device 18 could comprise more connecting portions 24, preferably equally distributed angularly. In a variant, an embodiment with only two connecting portions 24 may be provided, preferably aligned, or even a single connecting portion if the positioning of the component in the chamber 16 is not important.

A variant embodiment may also be provided where the component 20 is not held on the longitudinal axis X, in which case the connecting portions 24 are not necessarily radial.

Figure 3:
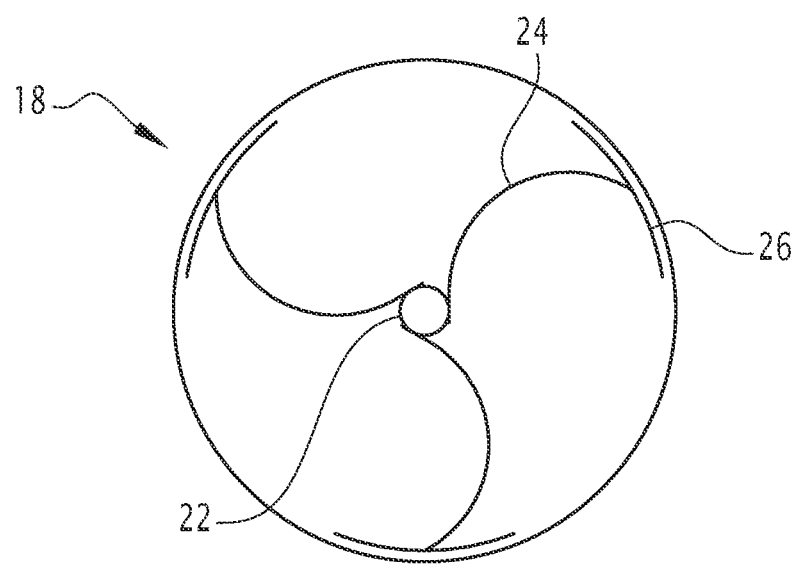
FIG. 3 shows schematically a holding device according to a second example of an embodiment of the disclosure.

According to the second embodiment shown in FIG. 3, the connecting portions 24 are formed by curved, e.g. helical elastic blades. Each connecting portion 24 is then connected to a connecting foot 26 as in the first embodiment.

In this second embodiment, the connecting feet 26 extend over a moderate angular portion of the inner surface, for example less than 60°. Each connecting foot 26 is bonded to the inner surface 14, for example, in particular by bonding over the entire contact area between the respective connecting foot 26 and inner surface 14. In a variant, the connecting feet 26 are simply pressed against the internal surface 14 under the effect of the elasticity of the elastic blades forming the connecting portions 24.

Figure 4:
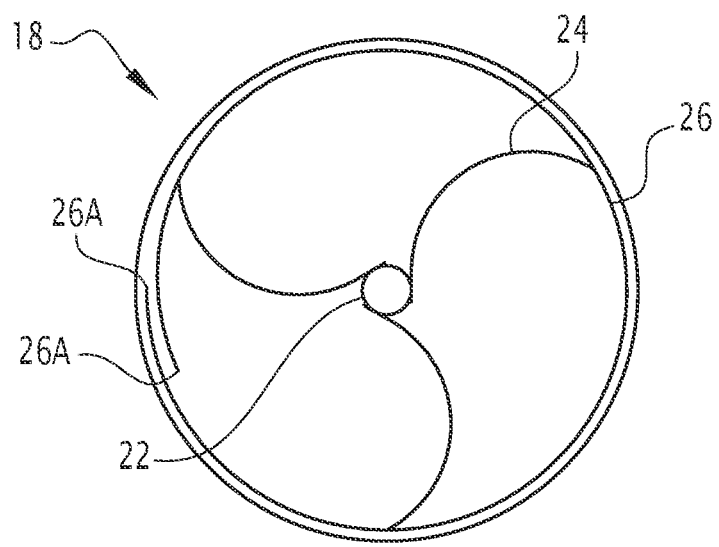
FIG. 4 shows schematically a holding device according to a third example of an embodiment of the disclosure.

The third embodiment, shown in FIG. 4, differs from the second embodiment in FIG. 3 in that the holding device 18 is connected to the inner surface 14 on a continuous circumferential contact line extending around the entire circumference of the inner surface 14.

More particularly, in this example, the holding device 18 has only one connecting foot 26 common to all connecting portions 24, extending around the entire circumference of the inner surface 14.

This single connecting foot 26 thus has a generally annular shape, extending circumferentially between two free edges 26A. In the example described, the free edges 26A overlap, so that the single connecting foot 26 covers the entire circumference of the inner surface 14 even when the inner surface 14 is deformed.

In a variant, the free edges 26A may not overlap as long as they allow the connecting foot 26 to accommodate deformations of the wall 12.

Figure 5:
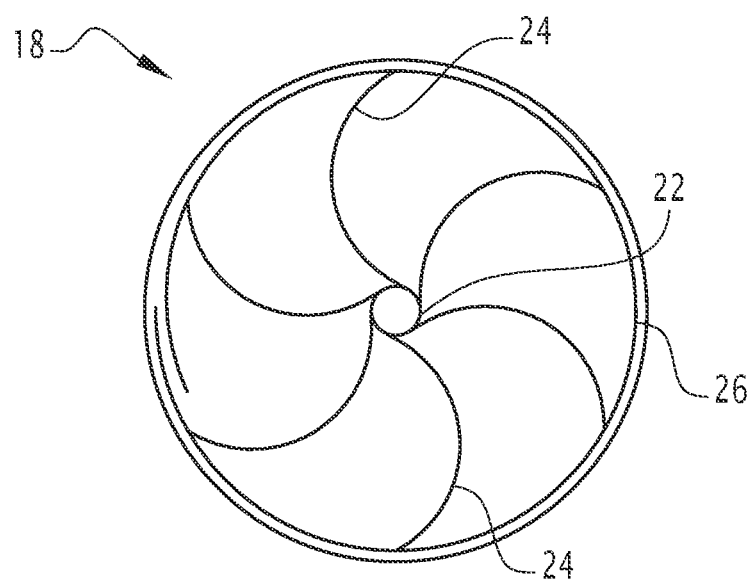
FIG. 5 shows schematically a holding device according to a fourth example embodiment of the disclosure.

The fourth embodiment in FIG. 5 differs from the third embodiment in FIG. 4 in that the holding device 18 in FIG. 5 has more connecting portions 24, such as six connecting portions 24, each formed by a curved blade, and elastically deformable in a radial direction, for example.

According to this fourth embodiment, the holding device 18 has a single circumferential connecting foot 26, similar to that of the third embodiment, to which all connecting portions 24 are connected.

Figure 6:
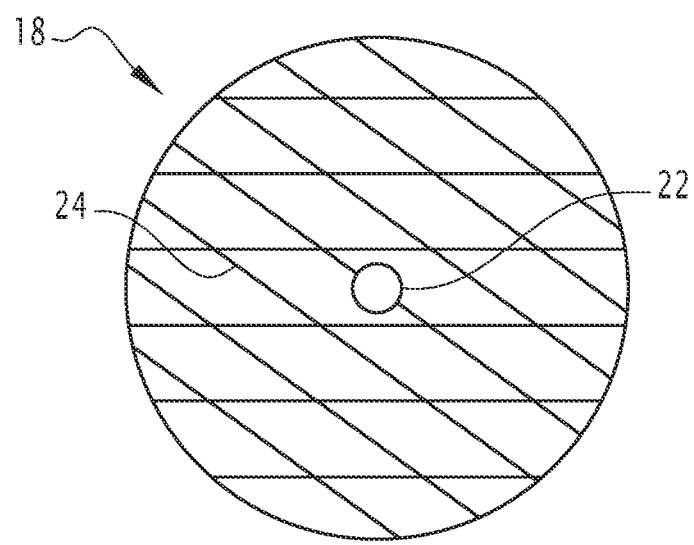
FIG. 6 shows schematically a holding device according to a fifth example embodiment of the disclosure.

According to the fifth embodiment, shown in FIG. 6, the holding device 18 includes a single circumferential connecting portion 24, extending circumferentially all around the holding portion 22. For example, this circumferential connecting portion 24 is formed by an elastically deformable foam.

In this case, the holding device 18 does not necessarily include a connecting foot 26, the foam being directly connected to the inner surface 14, on its periphery. In a variant, the foam has an annular connecting foot.

Figure 7:
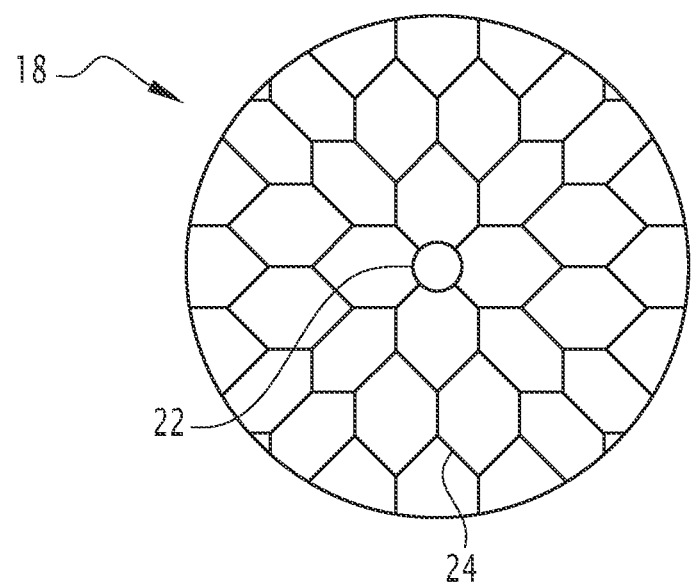
FIG. 7 shows schematically a holding device according to a sixth example embodiment of the disclosure.

In the sixth embodiment, shown in FIG. 7, the holding device 18 also has a single circumferential connecting portion 24, but this is formed by a mesh.

The mesh is elastically deformable. For example, the mesh is formed of honeycomb meshes.

In this case, the holding device 18 does not necessarily include a connecting foot 26, the mesh being directly connected to the inner surface 14, on its periphery. In a variant, the mesh has an annular connecting foot.

The seventh through ninth embodiments have holding devices 18 having components 20 that form baffles.

Such a baffle is intended to deflect the flow of hydrogen gas when filling the tank, thus ensuring better mixing of the gas and better temperature homogeneity within the tank. In particular, the gas movements due to the baffle make it possible to reduce the gas temperature.

The storage tank 10 may have a single baffle or a plurality to optimize gas mixing. In the case of a plurality of baffles, they may be identical, or, in a variant, at least one of them may be different to the others.

Various examples of baffles are described.

Figure 8:
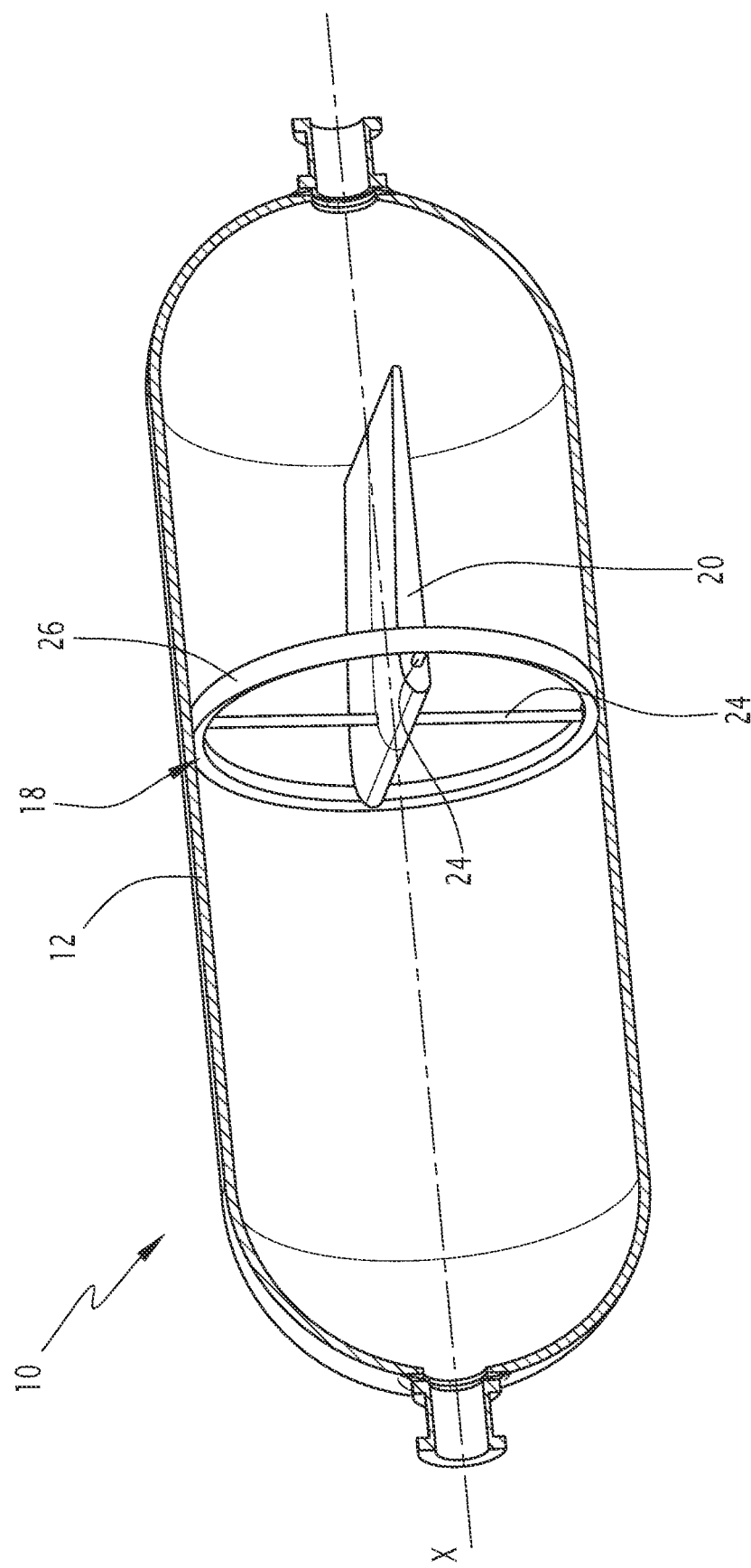
FIG. 8 shows schematically a holding device according to a seventh example embodiment of the disclosure.

According to the seventh embodiment, shown in FIG. 8, the baffle component 20 has an airplane wing shape extending along the longitudinal axis X. The airplane wing component 20 has a curved leading edge, and its thickness increases from the leading edge to a maximum thickness and then decreases to a trailing edge.

The airplane wing component 20 is held together by connecting portions 24 connecting this component 20 to a connecting foot 26. In the example described, the connecting foot 26 is unique, and extends circumferentially all around the component 20, but in a variant connecting feet 26 similar to those described above may be provided.

In the example described, one of the connecting portions 24 is formed by a first rod passing through the aircraft wing component 20 parallel to its thickness, and another of the connecting portions is formed by a second rod passing through the aircraft wing component 20 perpendicular to the first rod.

Advantageously, the airplane wing component 20 extends, in the direction of the longitudinal axis X, over at least a quarter of the length of the tank 10 in the same direction.

Figure 9:
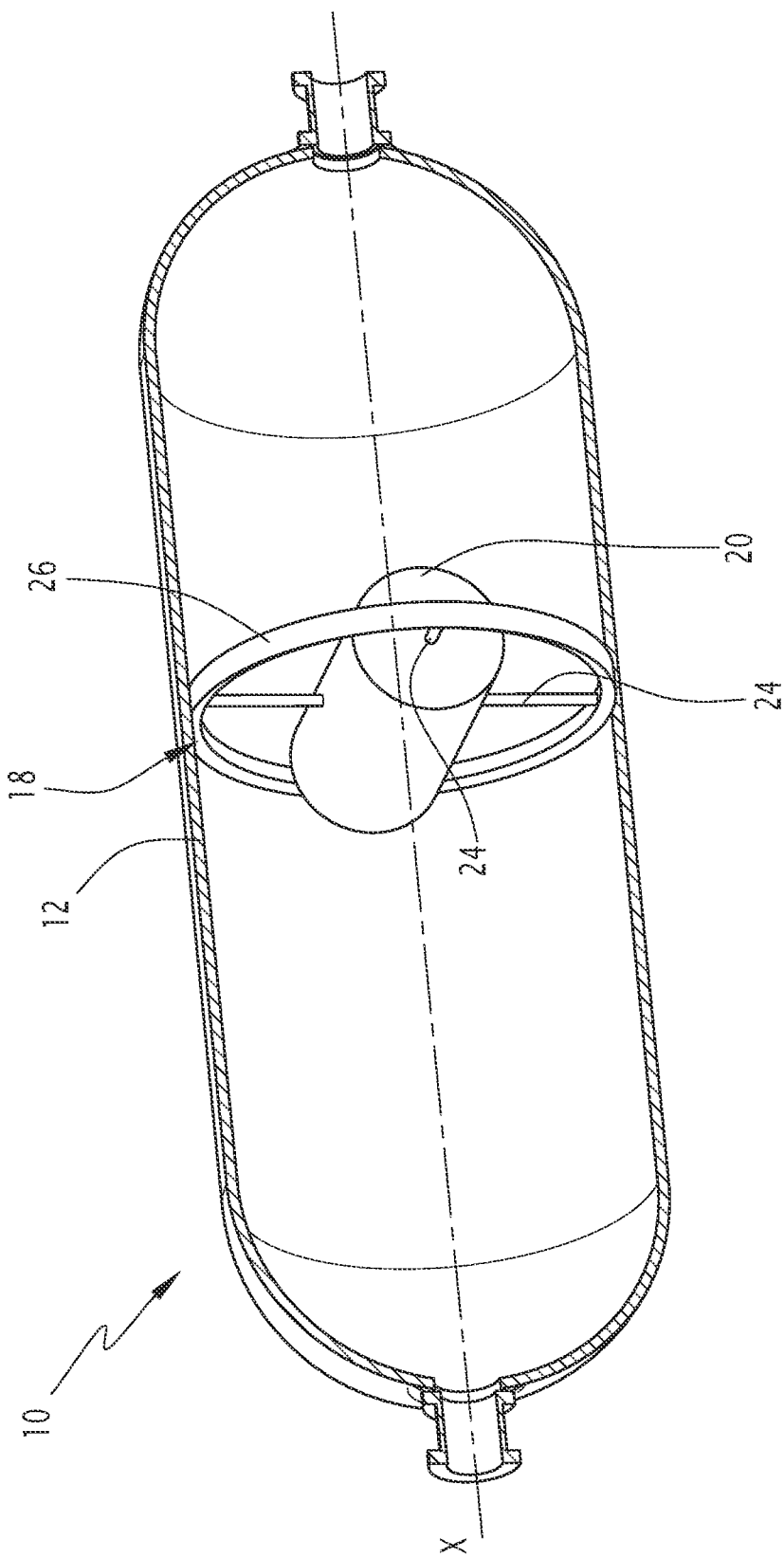
FIG. 9 shows schematically a holding device according to an eighth example embodiment of the disclosure.

According to the eighth embodiment, shown in FIG. 9, the baffle component 20 has a cylindrical shape with the axis extending perpendicular to the longitudinal axis X. In the example described, the cylinder has a circular base.

The cylindrical component 20 is held by connecting portions 24 connecting the component 20 to a connecting foot 26. In the described example, the connecting foot 26 is unique, and extends circumferentially all around the component 20, but in a variant, connecting feet 26 similar to those described above may be provided.

In the described example, one of the connecting portions 24 is formed by a first rod passing through the cylindrical component 20 along an axis of the cylinder, and another of the connecting portions is formed by a second rod passing through the cylindrical component 20 perpendicular to the first rod and the longitudinal axis X.

Figure 10:
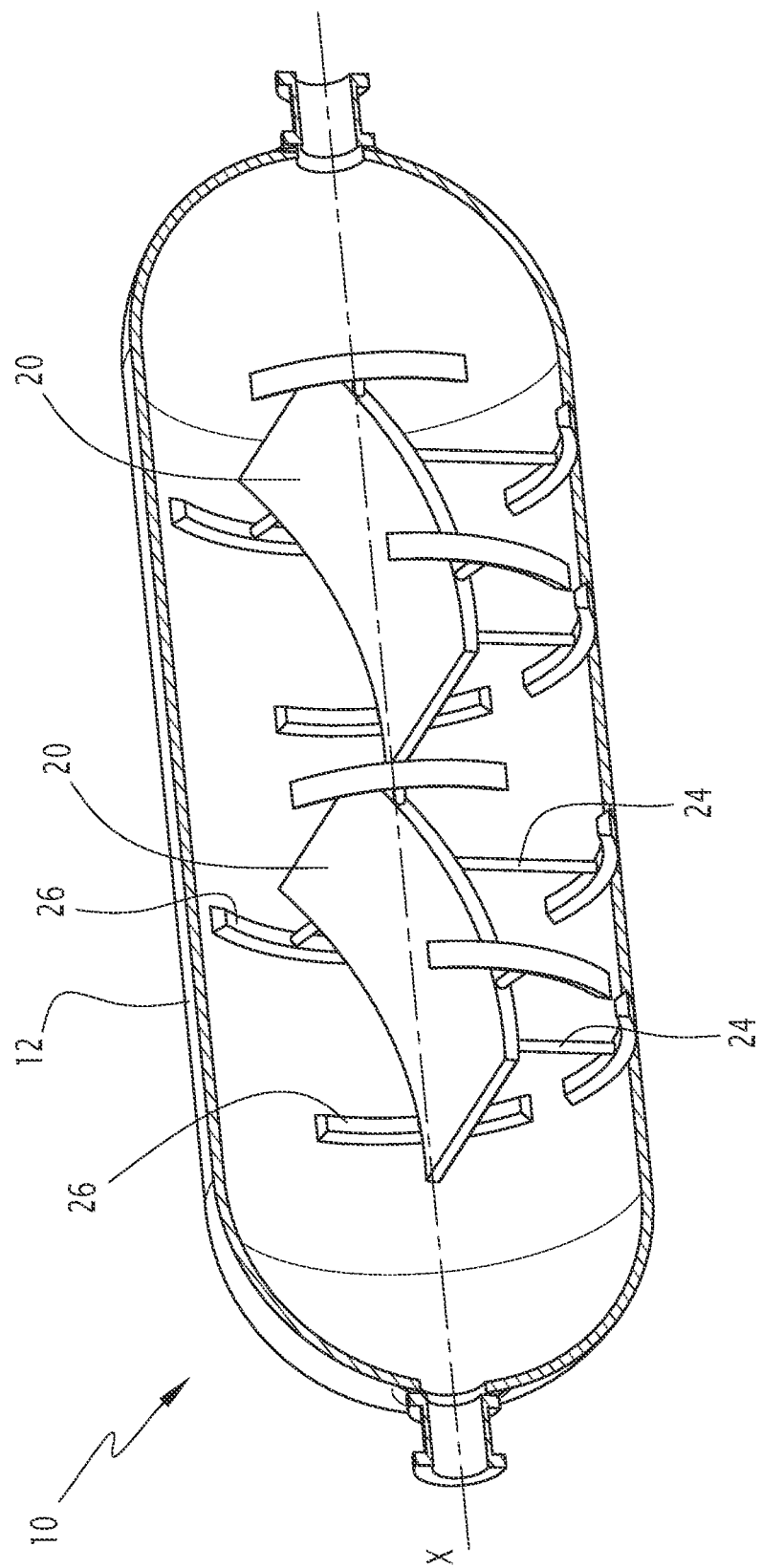
FIG. 10 shows schematically a holding device according to a ninth example embodiment of the disclosure.

According to the ninth embodiment, shown in FIG. 10, the baffle component 20 has a curved surface shape, being concave facing the gas inlet. In the described embodiment, the tank 10 includes two curved baffle components 20.

Each curved baffle component 20 is connected to a plurality of connecting feet 26 by connecting portions 24. Due to the length of this component 20, the component 20 has two sets of connecting feet 26 and related connecting portions 24 spaced apart in the direction of the longitudinal axis X.

Each curved baffle component 20 preferably extends, in the direction of the longitudinal axis X, at least a quarter of the length of the tank 10 in the same direction.

It will be noted that any other baffle shape can be provided in a variant, such as flat shaped baffles curved with a convex surface facing the gas inlet, airplane wing shape with other orientations than the one described in FIG. 8, a ski shape, etc.

Figure 11:
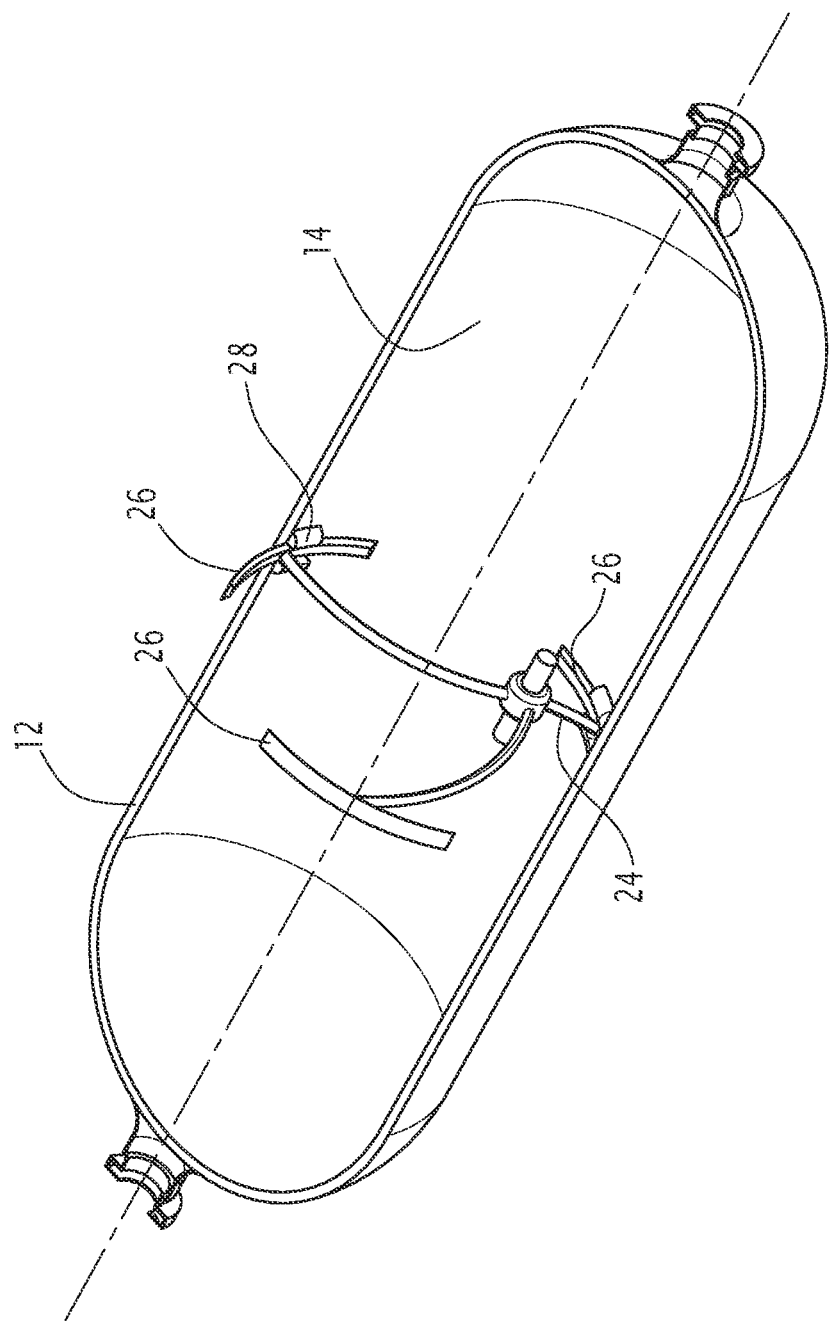
FIG. 11 is a perspective view of a holding device according to a tenth example embodiment of the disclosure.

A tank 10 according to a tenth embodiment has been shown in FIG. 11. In this Figure, elements similar to those in the preceding Figures are designated by identical references.

According to this tenth embodiment, the component 20 is not held on the longitudinal axis X, but offset in relation to this longitudinal axis.

Such a configuration is advantageous when there is a specific interest in arranging the component 20 in a particular location. For example, when the component 20 is a temperature measuring device, it may be of interest to offset the component 20, in particular to measure the temperature at the top or bottom of the tank, and not in the center.

It will be noted that several components may be arranged in the same manner in the tank 10, each at a different radial distance from the longitudinal axis X, for example.

In order to achieve this offset arrangement, the connecting portions 24 have different lengths. As shown in FIG. 11, the holding device 18 has two long connecting portions 24 (e.g. of the same length), for example, and one short connecting portion 24 (i.e. shorter than the other connecting portions).

In other words, the holding device 18 includes at least one connecting portion 24 of lesser length (and more particularly radial extent) than at least one other connecting portion 24.

In a variant, the holding device 18 could have three connecting portions 24, all having different lengths.

In this embodiment, the connecting feet 26 are similar to those shown in FIG. 3. It will be noted, however, that the inner surface 14 includes a pair of lugs 28 for each connecting foot 26, defining a groove for receiving the corresponding connecting foot 26. These lugs 28 form longitudinal stops for the corresponding connecting foot 26, but leave this connecting foot 26 free to rotate about the longitudinal axis X.

Figure 12:
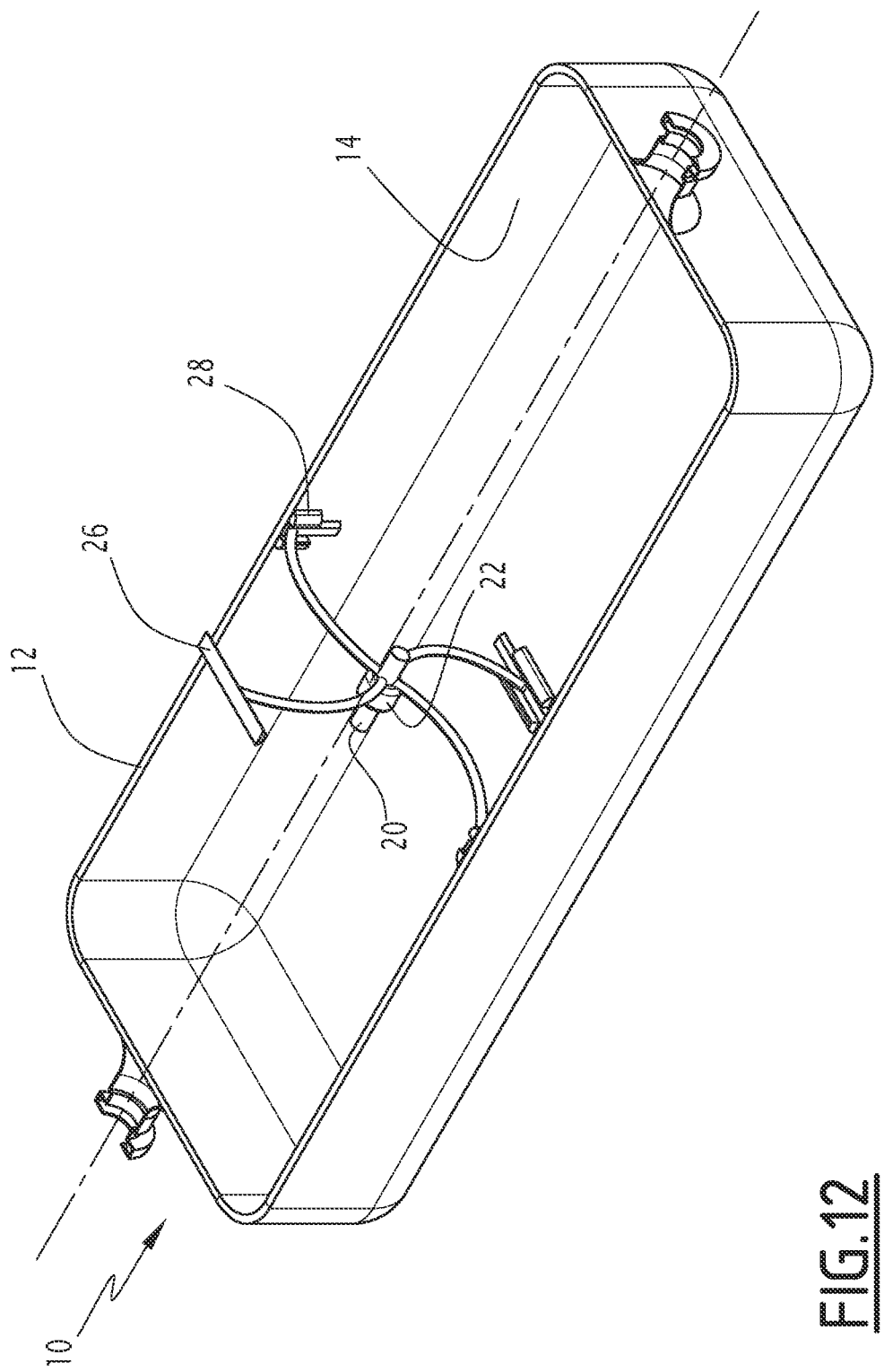
FIG. 12 is a perspective view of a holding device according to an eleventh embodiment of the disclosure.

A tank according to an eleventh embodiment is shown in FIG. 12. In this Figure, elements similar to those in the preceding Figures are designated by identical references.

According to this eleventh embodiment, the tank 10 has a generally parallelepiped shape, with a rectangular cross-section, preferably with rounded corners. In a variant, the tank 10 could have a square cross section, with or without rounded corners.

In this FIG. 12, the component 20 is held on the longitudinal axis X, but it could in a variant be offset, as in the tenth embodiment. In this case, the connecting portions 24 would not all have the same length.

It will be noted that, in the case of a tank with a rectangular cross-section, the holding device 18 preferably comprises four connecting portions 24, each of which rests on a respective face of the parallelepiped.

Furthermore, the connecting feet 26 are advantageously straight, as each rests on a respective flat face of the parallelepiped.

As in the tenth embodiment, the inner surface 14 includes, for each connecting foot 26, a pair of lugs 28 defining a groove for receiving the corresponding connecting foot 26. These lugs 28 form longitudinal stops for the corresponding connecting foot 26, but leave this connecting foot 26 free in translation along the respective flat face of the parallelepiped, in a direction perpendicular to the longitudinal axis X.

It will be noted that the disclosure is not limited to the previously described embodiments, but could have various variants without going beyond the scope of the claims.

In the examples described, the holding device 18 has a generally circular shape, but the holding device 18 may have any other shape suitable for the geometry of the inner surface 14, and preferably a shape complementary to that of the inner surface 14 (which may also be oval, rectangular, square, or any other specific cross-sectional shape).

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A pressurized gas storage tank comprising:
a gas storage chamber;
at least one holding device comprising a holding portion configured to receive a component in the gas storage chamber;
a wall having an inner surface delimiting the gas storage chamber, wherein the at least one holding device is connected to the inner surface by at least three points of contact;
wherein the at least one holding device is connected to the inner surface at a continuous circumferential line of contact extending around an entire circumference of the inner surface; and
at least one connecting portion that connects the holding portion to the inner surface, wherein the at least one connecting portion is elastically deformable, and wherein each connecting portion has a first end connected to the holding portion and a second end connected to the inner surface, and wherein each second end is held against the inner surface by being compressed against the inner surface by an elastic member of each connecting portion.

2. The pressurized gas storage tank according to claim 1, wherein, the gas storage chamber has a shape defined around a central longitudinal axis, chosen between a shape with a circular, oval, square section with or without rounded corners, or rectangular with or without rounded corners, the at least one holding device being configured to hold the component in one of the following configurations:
the component is held substantially on the central longitudinal axis, or
the component is offset in relation to the central longitudinal axis.

3. The pressurized gas storage tank according to claim 1, wherein the at least one connecting portion comprises a single circumferential connecting portion extending circumferentially around the holding portion, the single circumferential connecting portion being formed by a mesh.

4. The pressurized gas storage tank according to claim 1, wherein the gas storage chamber is configured to store a gas received through a gas inlet open to the gas storage chamber.

5. A pressurized gas storage tank comprising:
a gas storage chamber; and
at least one holding device configured to hold a component in the gas storage chamber, wherein:
the pressurized gas storage tank comprises a wall having an inner surface delimiting the gas storage chamber, wherein the at least one holding device is connected to the inner surface by at least three points of contact,
the at least one holding device is connected to the inner surface at a continuous circumferential line of contact extending around an entire circumference of the inner surface,
the at least one holding device comprises a holding portion configured to receive the component,
at least one connecting portion connects the holding portion to the inner surface, and
the at least one connecting portion comprises a plurality of connecting portions each extending radially from the same holding portion, each connecting portion being formed by an elastic member.

6. The pressurized gas storage tank according to claim 5, wherein each connecting portion has a first end connected to the holding portion and a second end connected to the inner surface.

7. The pressurized gas storage tank according to claim 6, wherein each second end is held against the inner surface by being compressed against the inner surface by the elastic member.

* * * * *